(12) United States Patent
Kim (10) Patent No.: US 11,958,354 B2
(45) Date of Patent: Apr. 16, 2024

(54) FOLDABLE PEDAL APPARATUS FOR AUTONOMOUS VEHICLE AND METHOD FOR CONTROLLING OPERATION THEREOF

(71) Applicants: Hyundai Motor Company, Seoul (KR); Kia Corporation, Seoul (KR)

(72) Inventor: Eun Sik Kim, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 300 days.

(21) Appl. No.: 17/509,955

(22) Filed: Oct. 25, 2021

(65) Prior Publication Data
US 2022/0388393 A1    Dec. 8, 2022

(30) Foreign Application Priority Data
Jun. 4, 2021   (KR) .................. 10-2021-0072991

(51) Int. Cl.
*B60K 26/02*        (2006.01)
*B60R 16/033*       (2006.01)
(Continued)

(52) U.S. Cl.
CPC .......... *B60K 26/02* (2013.01); *B60R 16/033* (2013.01); *B60R 21/09* (2013.01); *B60T 7/042* (2013.01);
(Continued)

(58) Field of Classification Search
CPC .............. B60K 26/02; B60K 2026/026; B60R 16/033; B60R 21/09; B60T 7/06;
(Continued)

(56) References Cited

U.S. PATENT DOCUMENTS 10,889,226 B1 *  1/2021  Dean .................. B60T 7/06
10,906,514 B1 *  2/2021  Kim .................... G05G 5/03
(Continued)

FOREIGN PATENT DOCUMENTS

DE   102019201074 A1 *  7/2020
JP   2006281796 A   * 10/2006
(Continued)

*Primary Examiner* — Keith J Frisby
(74) *Attorney, Agent, or Firm* — MORGAN, LEWIS & BOCKIUS LLP (57) ABSTRACT

A foldable pedal apparatus of an autonomous vehicle and a method for controlling an operation thereof, includes an accelerator pedal assembly generating an acceleration-related signal and a brake pedal assembly generating a brake-related signal during a driver's operation, in which in an autonomous driving mode, an accelerator pedal assembly and a brake pedal assembly move forward and are fixed to a position as they are combined with a front inclined surface of a footrest panel, and in a manual driving mode, they move and are fixed to a position where a driver can comfortably operate them, so that in case of switchover from the autonomous driving mode to the manual driving mode, the switchover to the manual driving mode becomes possible only in a state where all safety conditions for directivity of a driver's seat and positions of an accelerator pedal assembly and a brake pedal assembly are satisfied.

17 Claims, 10 Drawing Sheets

(51) Int. Cl.

| | |
|---|---|
| *B60R 21/09* | (2006.01) |
| *B60T 7/04* | (2006.01) |
| *B60T 7/06* | (2006.01) |
| *B60W 60/00* | (2020.01) |
| *G05G 1/36* | (2008.04) |
| *G05G 1/38* | (2008.04) |
| *G05G 1/405* | (2008.04) |
| *G05G 1/44* | (2008.04) |
| *G05G 1/60* | (2008.04) |
| *G05G 5/28* | (2006.01) |

(52) U.S. Cl.
CPC ........... *B60T 7/06* (2013.01); *B60W 60/0053* (2020.02); *G05G 1/36* (2013.01); *G05G 1/38* (2013.01); *G05G 1/405* (2013.01); *G05G 1/44* (2013.01); *G05G 1/60* (2013.01); *G05G 5/28* (2013.01); *B60K 2026/026* (2013.01); *B60T 2220/04* (2013.01); *B60W 60/0051* (2020.02); *B60W 2540/10* (2013.01); *B60W 2540/12* (2013.01)

(58) Field of Classification Search
CPC . B60T 7/065; B60T 7/042; B60T 7/04; B60T 2220/04; G05G 1/38; G05G 1/36; G05G 1/40; G05G 1/405; G05G 1/44; G05G 1/60; G05G 1/30; G05G 5/28; B60W 60/0051; B60W 60/0053; B60W 2540/10; B60W 2540/12; G05D 1/0061
USPC ........... 180/326, 315, 334; 74/512, 513, 478
See application file for complete search history.

(56) References Cited

U.S. PATENT DOCUMENTS

| | | | |
|---|---|---|---|
| 10,946,741 B1* | 3/2021 | Kim | B60T 7/06 |
| 11,021,058 B1* | 6/2021 | Kim | G05G 5/28 |
| 11,148,646 B2* | 10/2021 | Ghaffari | B60T 7/06 |
| 11,225,226 B1* | 1/2022 | Kim | B60T 7/042 |
| 11,249,506 B1* | 2/2022 | Kim | G05G 5/28 |
| 2015/0253804 A1* | 9/2015 | Baur | G05G 1/40 |
| | | | 180/315 |
| 2019/0302827 A1* | 10/2019 | Wojciechowski | G05D 1/0242 |
| 2020/0257329 A1* | 8/2020 | Kihara | B60T 7/06 |
| 2020/0317152 A1* | 10/2020 | Ghaffari | B60T 7/042 |
| 2020/0317167 A1* | 10/2020 | Ghaffari | G05D 1/0061 |
| 2020/0398725 A1* | 12/2020 | Mullen | B60N 3/044 |
| 2021/0109560 A1* | 4/2021 | Ford | G05G 1/44 |
| 2021/0149432 A1* | 5/2021 | Neubauer | B60T 7/042 |
| 2021/0170988 A1* | 6/2021 | Villalva Sanchez | B60R 21/09 |
| 2022/0048384 A1* | 2/2022 | Kim | G05G 5/28 |
| 2022/0055477 A1* | 2/2022 | Kim | B60K 26/021 |
| 2022/0135112 A1* | 5/2022 | Harmon | B62D 1/183 |
| | | | 180/334 |
| 2022/0144224 A1* | 5/2022 | Tarandek | G05G 5/03 |
| 2022/0147093 A1* | 5/2022 | Kim | G05G 1/44 |
| 2023/0001788 A1* | 1/2023 | Hariu | B60K 26/021 |

FOREIGN PATENT DOCUMENTS

| | | | |
|---|---|---|---|
| JP | 2018116383 A * | 7/2018 | |
| JP | 2018205856 A * | 12/2018 | |
| KR | 20170000013 A * | 1/2017 | |
| KR | 10-2017-0137427 A | 12/2017 | |
| KR | 101887699 B1 * | 8/2018 | |
| WO | WO-2019007840 A1 * | 1/2019 | |

* cited by examiner

FOLDABLE PEDAL APPARATUS FOR AUTONOMOUS VEHICLE AND METHOD FOR CONTROLLING OPERATION THEREOF

CROSS REFERENCE TO RELATED APPLICATION

The present application claims priority to Korean Patent Application No. 10-2021-0072991 filed on Jun. 4, 2021, the entire contents of which is incorporated herein for all purposes by this reference.

BACKGROUND OF THE PRESENT INVENTION

Field of the Invention

The present invention relates to a foldable pedal apparatus for an autonomous vehicle and a method for controlling an operation thereof, and more particularly, to a foldable pedal apparatus for an autonomous vehicle and a method for controlling an operation thereof, in which in case of a manual driving mode, an accelerator pedal assembly and a brake pedal assembly move and are fixed to a position where a driver can comfortably operate them, and in an autonomous driving mode, they are fixed to a footrest panel, and in case of switchover from the autonomous driving mode to the manual driving mode, the switchover to the manual driving mode becomes possible only in a state where all safety conditions are satisfied.

Description of Related Art

An autonomous vehicle is a smart vehicle grafted with autonomous driving technology to go to the destination by itself even though a driver does not directly operate a handle, an acceleration pedal, and a brake, and the development thereof has recently been progressed rapidly.

In case that an autonomous driving mode becomes universal, the driver may select a manual driving mode in which the driver directly drives a vehicle or an autonomous driving mode in which the driver does not directly drive the vehicle, but the vehicle drives by itself to the destination.

In the autonomous driving mode, it is necessary for the driver to extend out his or her feet and to get some rest comfortably, and if pedals (accelerator pedal and brake pedal) located in a lower space of a driver's seat still exist therein in an exposed state in the autonomous driving mode, there are disadvantages that they interfere with the driver's rest.

Furthermore, the autonomous driving mode is the situation in which the driver does not operate the vehicle pedals (accelerator pedal and brake pedal), and if the driver operates the pedals during the autonomous driving, a vehicle controller may determine the current situation as the situation in which the driver desires to end the autonomous driving and to directly drive the vehicle, and thus may end the control for the autonomous driving.

However, since the vehicle pedals are provided to be exposed to the lower space of the driver's seat, it is feared that the driver unconsciously operates the pedals in the autonomous driving mode (pedal misoperation situation), and in the instant case, there is a risk of an accident depending on a road situation or a distance between vehicles.

Accordingly, there is a demand for technology development of a foldable pedal apparatus, in which in case of a manual driving mode where a driver directly drives the vehicle, a pedal pad is exposed to project toward the driver to make a driver's operation possible, whereas in case of an autonomous driving mode, the exposure of the pedal pad is blocked to make the driver's operation impossible for driver's comfortable rest and safety, such as prevention of a misoperation.

Furthermore, a general foldable pedal apparatus in the related art has disadvantages in that in case of the switchover from the autonomous driving mode to the manual driving mode, a popup volume projecting from the footrest panel is constant, and thus it is uncomfortable to operate the pedal apparatus when each driver has a different body condition.

Furthermore, in case of the switchover from the autonomous driving mode to the manual driving mode in the autonomous vehicle provided with a foldable pedal apparatus generally, there is not a checking process of a safety condition for checking whether the switchover to the manual driving mode is possible, and thus there are risks of driver's misoperation and accident occurrence.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a foldable pedal apparatus for an autonomous vehicle, in which in an autonomous driving mode, an accelerator pedal assembly and a brake pedal assembly move forward and are fixed to a position (hide state) as they are combined with a front inclined surface of a footrest panel, and in a manual driving mode, they move and are fixed to a position where a driver can comfortably operate them (popup state), so that in case of switchover from the autonomous driving mode to the manual driving mode, the fixed position of the pedal apparatus can be differently set for each driver, and thus driver's convenience can be improved in operating the pedal apparatus.

Various aspects of the present invention are directed to providing a control method, in which in case of switchover from an autonomous driving mode to a manual driving mode, the switchover to the manual driving mode becomes possible only in a state where all safety conditions for directivity of a driver's seat and positions of an accelerator pedal assembly and a brake pedal assembly are satisfied, and through this, risks of driver's misoperation and accident occurrence can be greatly reduced.

A foldable pedal apparatus for an autonomous vehicle according to various exemplary embodiments of the present invention to achieve the above objects includes: an accelerator pedal assembly generating an acceleration-related signal and a brake pedal assembly generating a brake-related signal in response to operation of the accelerator pedal assembly and the brake pedal assembly, wherein in an autonomous driving mode of the vehicle, the accelerator pedal assembly and the brake pedal assembly get into a hide state as the accelerator pedal assembly and the brake pedal assembly get come in contact with a front inclined surface of a footrest panel and positions thereof are fixed, and in a manual driving mode of the vehicle, the accelerator pedal assembly and the brake pedal assembly get into a popup state as positions of the accelerator pedal assembly and the brake pedal assembly are fixed to a bottom surface of the footrest panel in a state where the accelerator pedal assembly and the brake pedal assembly move to positions desired by a driver on the bottom surface.

Each of the accelerator pedal assembly and the brake pedal assembly includes a base portion coming in contact with the bottom surface of the footrest panel; a pad portion hingedly connected to the base portion and rotatably operating in response to a movement of a driver's foot or shoe coming in contact thereto; and a return spring engaged to the pad portion and providing a return force to the pad portion when the pad portion is rotated.

Each of the accelerator pedal assembly and the brake pedal assembly further includes a band portion provided on the pad portion so as to surround and fasten a foot or a shoe of a driver coming in contact with the pad portion, to the pad portion.

A bottom end portion of the pad portion is hingedly connected to one end portion of the base portion and a top end portion of the pad portion is pivotable around the hinge pin of the bottom end portion.

A pad groove, into which the one end portion of the base portion is inserted, is formed at a bottom end portion of the pad portion, and when the pad portion is rotated against the base portion around the hinge pin, the pad groove comes in contact with the base portion and regulates a full stroke position and an initial position of the pad portion.

A permanent magnet is provided on the pad portion, and as the permanent magnet is magnetically coupled to the front inclined surface of the footrest panel, the pad portion comes in contact with the front inclined surface of the footrest panel and a position of the pad portion is fixed, so that the accelerator pedal assembly and the brake pedal assembly maintain the hide state in the autonomous driving mode.

A guide hole, through which the base portion penetratingly moves, is formed in the footrest panel so that the pad portion comes in contact with the front inclined surface of the footrest panel when the base portion penetratingly moves through the guide hole.

An electromagnet and a battery supplying a power to the electromagnet are provided on the base portion, and as the electromagnet is magnetized and is magnetically coupled to the bottom surface of the footrest panel, a position of the base portion is fixed to the bottom surface of the footrest panel in a state where the base portion moves to the position desired by the driver on the bottom surface, and the accelerator pedal assembly and the brake pedal assembly maintain the popup state in the manual driving mode.

An electromagnet control printed circuit boards (PCB) configured for controlling a power supply of the battery to the electromagnet is further provided on the base portion, and the electromagnet control PCB is configured to perform a control operation through reception of a signal of an electromagnet button provided on a driver's seat.

A signal recognition PCB is provided on the base portion to face the permanent magnet, and when the pad portion is rotated, the signal recognition PCB is configured to detect a rotation angle of the pad portion through flux changes of the permanent magnet, and generates the acceleration-related signal or the brake-related signal.

A PCB for position detection is provided on the front inclined surface of the footrest panel to detect a situation in which the permanent magnet of the pad portion is magnetically coupled to the front inclined surface of the footrest panel, and a PCB for charging control, which generates a charging signal to the battery through reception of a signal of the PCB for position detection, is provided on a body panel connected to the footrest panel.

Furthermore, a method for controlling an operation of a foldable pedal apparatus of an autonomous vehicle according to various exemplary embodiments of the present invention includes: detecting directivity of a driver's seat, a position of an accelerator pedal assembly, and a position of a brake pedal assembly using signals of a driver's seat sensor, an accelerator pedal position sensor, and a brake pedal position sensor, respectively when a manual driving mode signal is generated in response to operation of a driving mode switch in an autonomous driving mode after a vehicle startup; and supplying a power to an electromagnet when an electromagnet button provided on the driver's seat is operated while switching the accelerator pedal assembly and the brake pedal assembly to a manual driving mode under the control of an autonomous driving controller only in case of determining that all of the directivity of the driver's seat, the position of the accelerator pedal assembly, and the position of the brake pedal assembly satisfy safety conditions.

The safety conditions include a first condition on which the driver's seat faces a vehicle front when the manual driving mode signal is generated in the autonomous driving mode, a second condition on which the accelerator pedal assembly is positioned in front of the driver's seat, and a third condition on which the brake pedal assembly is positioned in front of the driver's seat, wherein the accelerator pedal assembly and the brake pedal assembly are switched to the manual driving mode only in case that all of the first, second and third conditions are satisfied.

The safety conditions further include a fourth condition on which the accelerator pedal assembly is positioned on the right of the brake pedal assembly, wherein the accelerator pedal assembly and the brake pedal assembly are switched to the manual driving mode only in case that all of the first, second, third and fourth conditions are satisfied.

According to the exemplary embodiment of the present invention, in an autonomous driving mode, an accelerator pedal assembly and a brake pedal assembly move forward and are fixed to a position (hide state) as they are combined with a front inclined surface of a footrest panel, and in a manual driving mode, they move and are fixed to a position where a driver can comfortably operate them (popup state), so that in case of switchover from the autonomous driving mode to the manual driving mode, the fixed position of the pedal apparatus may be differently set for each driver, and thus driver's convenience may be improved in operating the pedal apparatus.

According to the exemplary embodiment of the present invention, in case of switchover from an autonomous driving mode to a manual driving mode, the switchover to the manual driving mode becomes possible only in a state where all safety conditions for directivity of a driver's seat and positions of an accelerator pedal assembly and a brake pedal assembly are satisfied, and through this, risks of driver's misoperation and accident occurrence may be greatly reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and/or functional explanations on embodiments of the present invention disclosed in the exemplary embodiment or application are merely exemplified for the purpose of explaining the exemplary embodiments of the present invention, and the exemplary embodiments according to various exemplary embodiments of the present invention may be carried out in various forms, and should not be interpreted to be limited to the exemplary embodiments described in the exemplary embodiment or application.

Since embodiments according to various exemplary embodiments of the present invention may be variously modified and may have various forms, specific embodiments will be exemplified in the drawings and will be described in detail in the exemplary embodiment or application. However, it should be understood that the exemplary embodiments according to the concept of the present invention are not limited to the specific disclosed forms, but include all modifications, equivalents, and/or alternatives that are included in the idea and technical scope of the present invention.

The terms, such as "first and/or second", may be used to describe diverse constituent elements, but the constituent elements should not be limited by the terms. The terms are only for the purpose of discriminating one constituent element from another constituent element, and for example, without departing from the scope according to the concept of the present invention, a first constituent element may be called a second constituent element, and the second constituent element may be called the first constituent element in a similar manner.

It should be understood that if a certain constituent element is mentioned to be "connected" or "coupled" to another constituent element, it includes both a case that the certain constituent element is directly connected or coupled to the another constituent element and a case that the certain constituent element is connected or coupled to the another constituent element via yet another constituent element. In contrast, if a certain constituent element is mentioned to be "directly connected or coupled" to another constituent element, it should be understood that the certain constituent element is connected or coupled to another constituent element without intervention of any other constituent element. Other expressions for explaining the relationship between the constituent elements, that is, "between" and "just between" or "neighboring" and "directly neighboring" should be interpreted in the same manner.

The terms used in the exemplary embodiment are used to describe specific embodiments only, but are not intended to limit the present invention. A singular expression includes a plural expression unless clearly defined in a different manner. In the exemplary embodiment, it should be understood that the term "include" or "have" specifies the presence of stated features, numerals, steps, operations, constituent elements, parts, or a combination thereof, but does not preclude the presence or addition of one or more other features, numerals, steps, operations, constituent elements, parts, or a combination thereof.

Unless otherwise defined, all terms (including technical and scientific terms) used herein have the same meanings as those commonly understood by those ordinary skilled in the art to which various exemplary embodiments of the present invention belongs. The terms that are used in the exemplary embodiment and are defined in a generally used dictionary should be interpreted as meanings that match with the meanings of the terms from the context of the related technology, and they are not interpreted as an ideal or excessively formal meaning unless clearly defined.

A control unit (controller) according to various exemplary embodiments of the present invention may be implemented through a nonvolatile memory configured to store an algorithm configured to control operations of various constituent elements of a vehicle or data for software instructions to reproduce the algorithm and a processor configured to perform an operation to be described hereinafter using the data stored in the corresponding memory. Here, the memory and the processor may be implemented by individual chips. Alternatively, the memory and the processor may be implemented by a single integrated chip. The processor may be in a form of one or more processors.

Hereinafter, a foldable pedal apparatus for an autonomous vehicle and a method for controlling an operation thereof according to various exemplary embodiments of the present invention will be described with reference to the accompanying drawings.

As illustrated in FIG. 1, FIG. 2, FIG. 3, FIG. 4, FIG. 5, FIG. 6, FIG. 7, and FIG. 8, a foldable pedal apparatus for an autonomous vehicle according to various exemplary embodiments of the present invention includes an accelerator pedal assembly 100 and a brake pedal assembly 200 generating an acceleration-related signal and a brake-related signal during a driver's operation, wherein in an autonomous driving mode, the accelerator pedal assembly 100 and the brake pedal assembly 200 get into a hide state as they come in contact with a front inclined surface 11 of a footrest panel 10 and positions thereof are fixed, and in a manual driving mode, the accelerator pedal assembly 100 and the brake pedal assembly 200 get into a popup state as the positions thereof are fixed to a bottom surface 12 of the footrest panel 10 in a state where they move to positions desired by a driver on the bottom surface 12. Here, the positions desired by the driver is determined by the will of the driver of the vehicle in the manual driving mode. Furthermore, the positions desired by the driver may vary depending on personal preferences of the driver or specific driving conditions.

In the hide state, the exposure of the accelerator pedal assembly 100 and the brake pedal assembly 200 toward the driver is blocked to make the driver's operation impossible, and in the popup state, the accelerator pedal assembly 100 and the brake pedal assembly 200 are exposed toward the driver to make the driver's operation possible.

Figure 1:
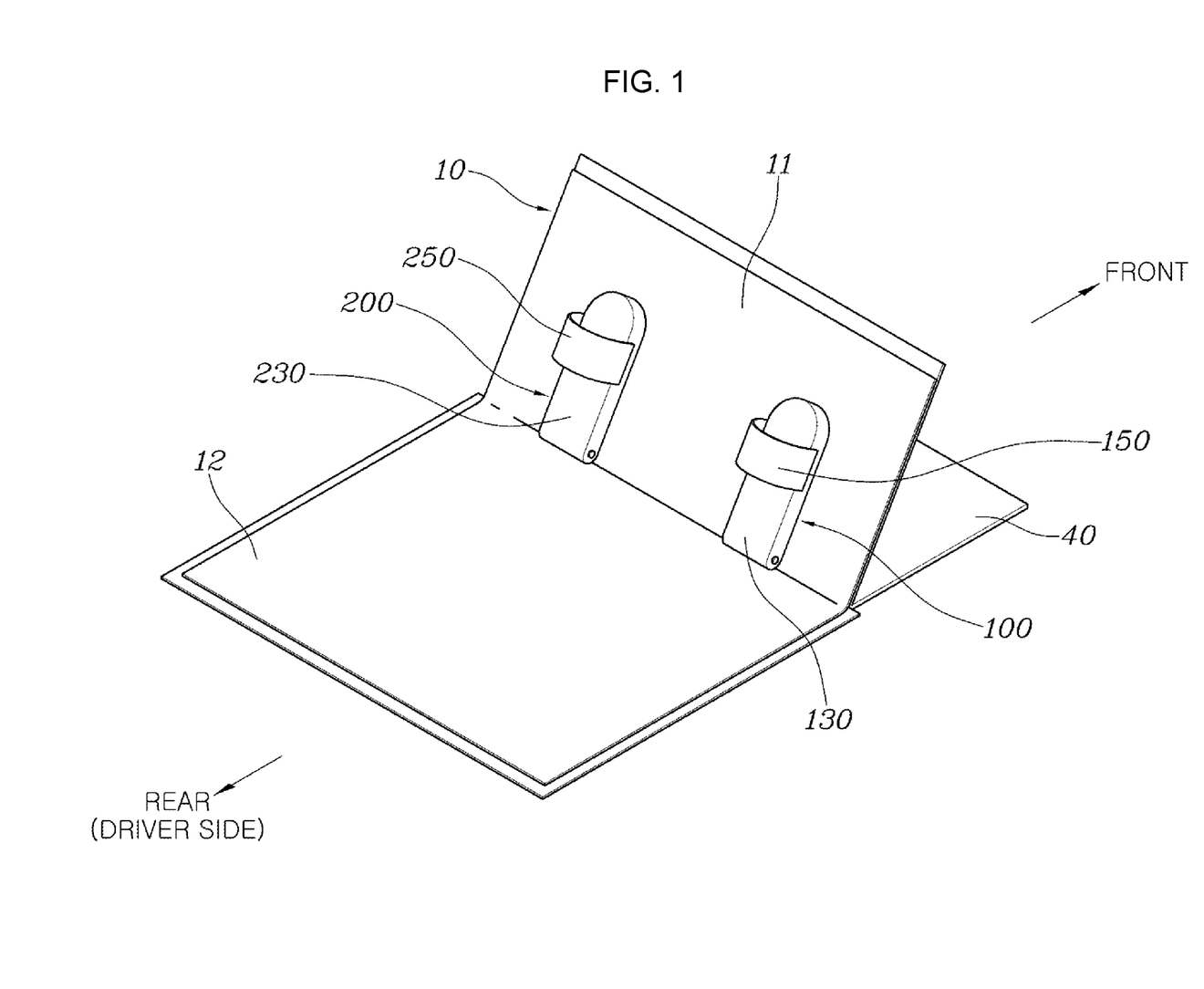
FIG. 1 is a view exemplarily illustrating a foldable pedal apparatus of an autonomous vehicle according to various exemplary embodiments of the present invention, which is in a hide state where an accelerator pedal assembly and a brake pedal assembly come in contact with a front inclined surface of a footrest panel.
Figure 2:
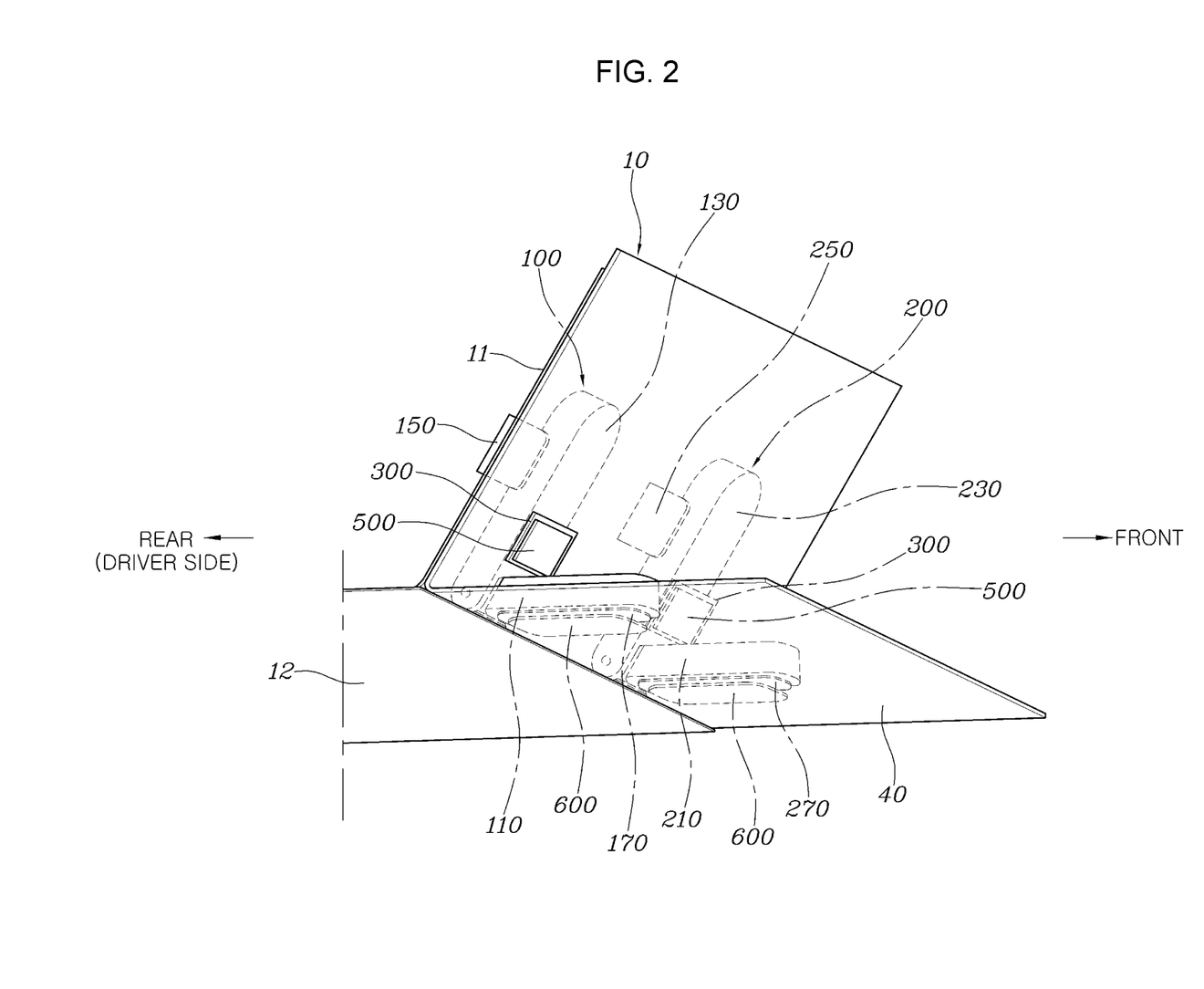
FIG. 2 is a view as seen from a front bottom side of FIG. 1.

In the foldable pedal apparatus according to various exemplary embodiments of the present invention, if the accelerator pedal assembly 100 and the brake pedal assembly 200 move forward and get into a fixed state in which they come in contact with the front inclined surface 11 of the footrest panel 10, the accelerator pedal assembly 100 and the brake pedal assembly 200 maintain the hide state in which the exposure of the accelerator pedal assembly 100 and the brake pedal assembly 200 toward the driver is blocked (refer to FIG. 1 and FIG. 2).

Figure 3:
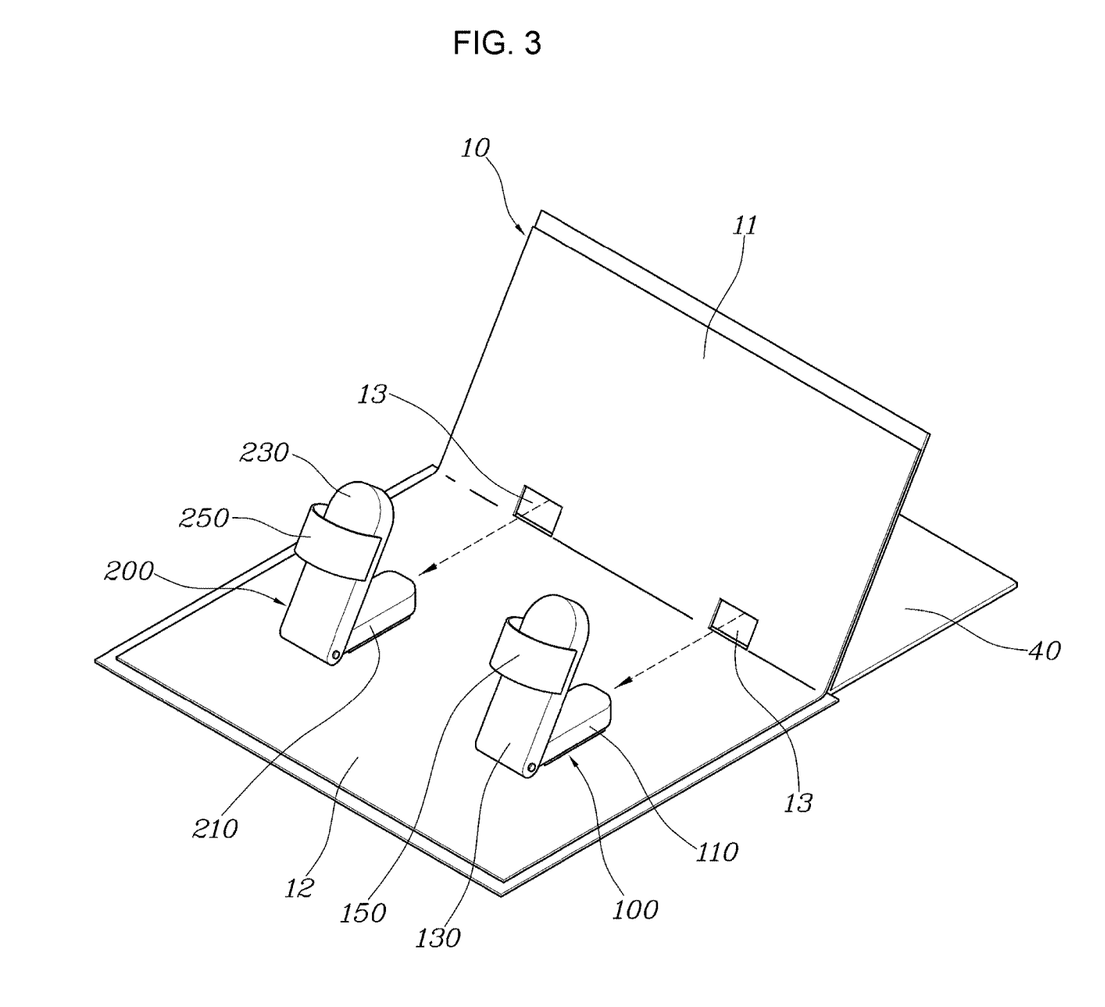
FIG. 3 is a view exemplarily illustrating a popup state in which an accelerator pedal assembly and a brake pedal assembly move backward in FIG. 1.

Furthermore, in the foldable pedal apparatus according to various exemplary embodiments of the present invention, if the accelerator pedal assembly 100 and the brake pedal assembly 200 move backward and are spaced from the front inclined surface 11 of the footrest panel 10, the accelerator pedal assembly 100 and the brake pedal assembly 200 maintain the popup state in which the accelerator pedal assembly 100 and the brake pedal assembly 200 are exposed toward the driver (refer to FIG. 3).

The footrest panel 10 is located in a lower space of the driver's seat, and includes a bottom surface 12 extending in back and forth directions and the front inclined surface 11 extending forward upwards from a front end portion of the bottom surface 12.

The accelerator pedal assembly 100 or the brake pedal assembly 200 according to various exemplary embodiments of the present invention includes a base portion 110 or 210 coming in contact with the bottom surface 12 of the footrest panel 10, a pad portion 130 or 230 rotatably combined with the base portion 110 or 210 via a hinge pin 120 or 220 and coming in contact with a driver's foot or shoe 20 to be rotatably operated, a return spring 140 or 240 providing a return force to the pad portion 130 or 230 when the pad portion 130 or 230 is rotated, and a band portion 150 or 250 provided on the pad portion 130 or 230 to surround and fix the driver's foot or shoe 20 coming in contact with the pad portion 130 or 230.

The return spring 140 or 240 is a coil spring which is provided to be wound on the hinge pin 120 or 220, and may have one end portion fixed to the base portion 110 or 210 and the other end portion fixed to the pad portion 130 or 230.

The band portion 150 or 250 is made of an elastic material having elasticity to surround and fix the driver's foot or shoe 20 coming in contact with the pad portion 130 or 230.

The pad portion 130 or 230 according to various exemplary embodiments of the present invention has an organ type structure in which a bottom end portion of the pad portion 130 or 230 is rotatably combined with one end portion of the base portion 110 or 210 via the hinge pin 120 or 220 and a top end portion of the pad portion 130 or 230 is rotated back and forth around the hinge pin 120 or 220 of the bottom end portion, and the pad of the organ type structure can improve convenience during the driver's operation in comparison with a pendant type structure.

Furthermore, a pad groove 131 or 231, into which the one end portion of the base portion 110 or 210 is inserted, is formed at a bottom end portion of the pad portion 130 or 230, and the hinge pin 120 or 220 is provided to cross the pad groove 131 or 231.

Accordingly, when the pad portion 130 or 230 is rotated against the base portion 110 or 210 around the hinge pin 120 or 220, the pad groove 131 or 231 comes in contact with the base portion 110 or 210 and regulates a full stroke position and an initial position of the pad portion 130 or 230.

Figure 4:
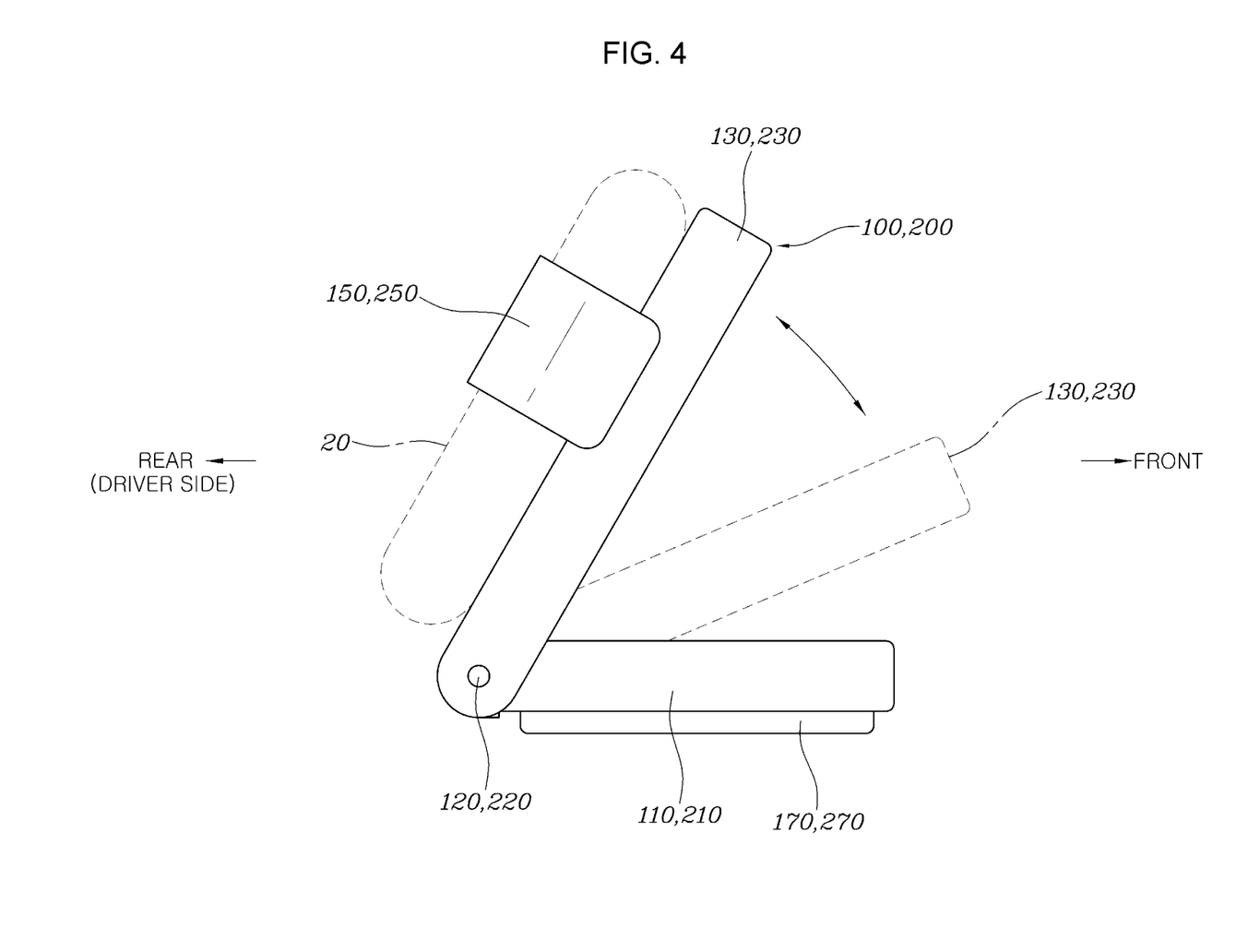
FIG. 4 is a side view of an accelerator pedal assembly and a brake pedal assembly.
Figure 5:
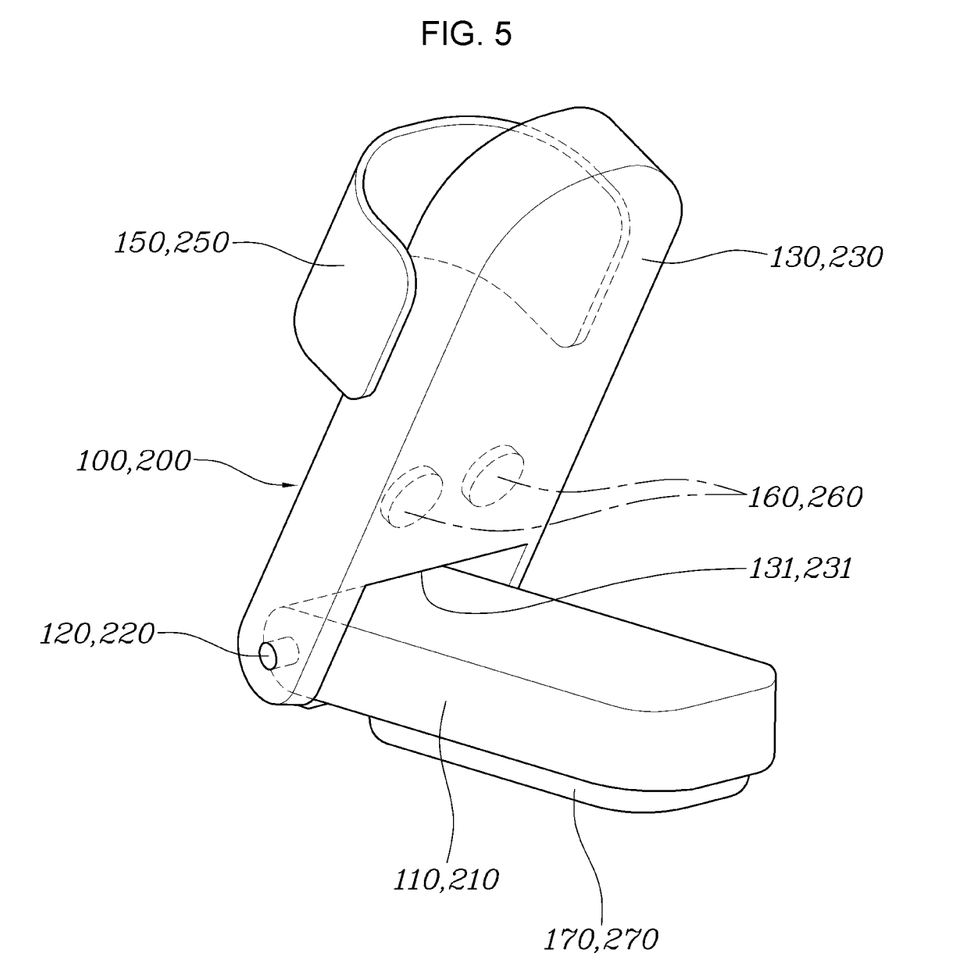
FIG. 5 is a perspective view of FIG. 4.
Figure 6:
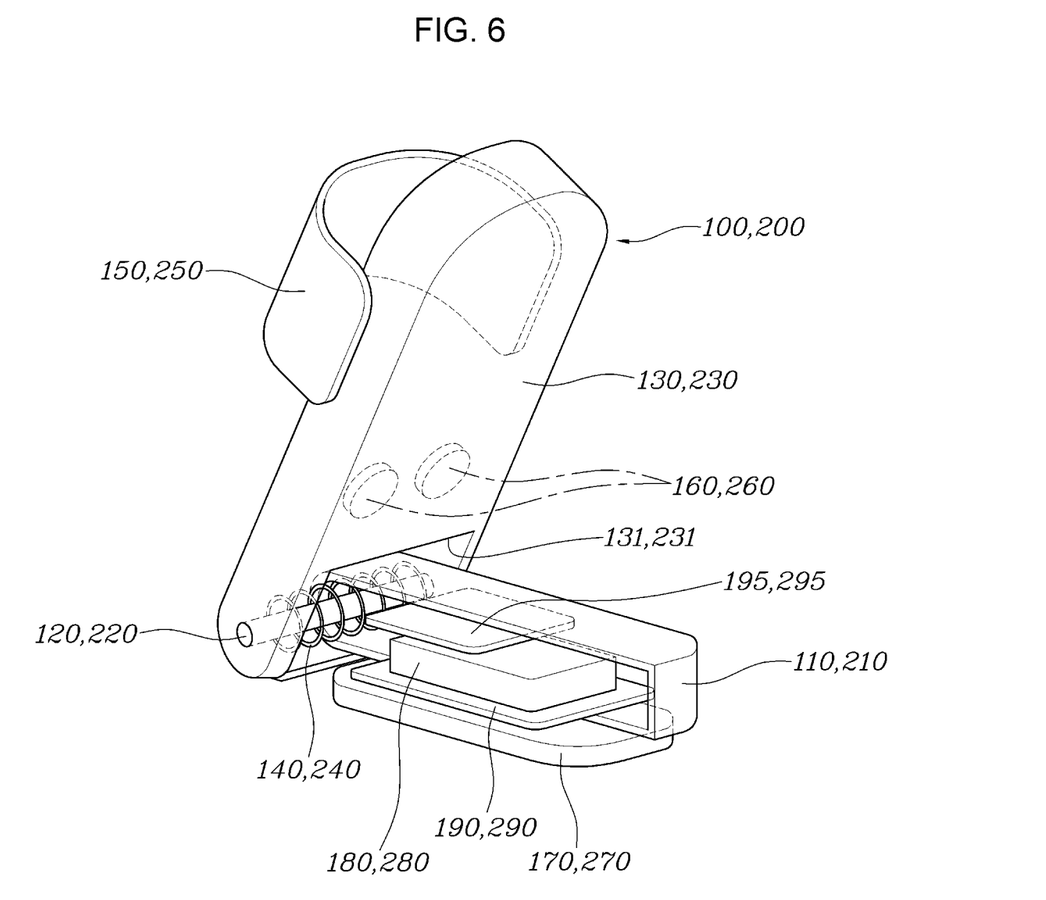
FIG. 6 is a view of a base portion of FIG. 5, being partially cut.
Figure 7:
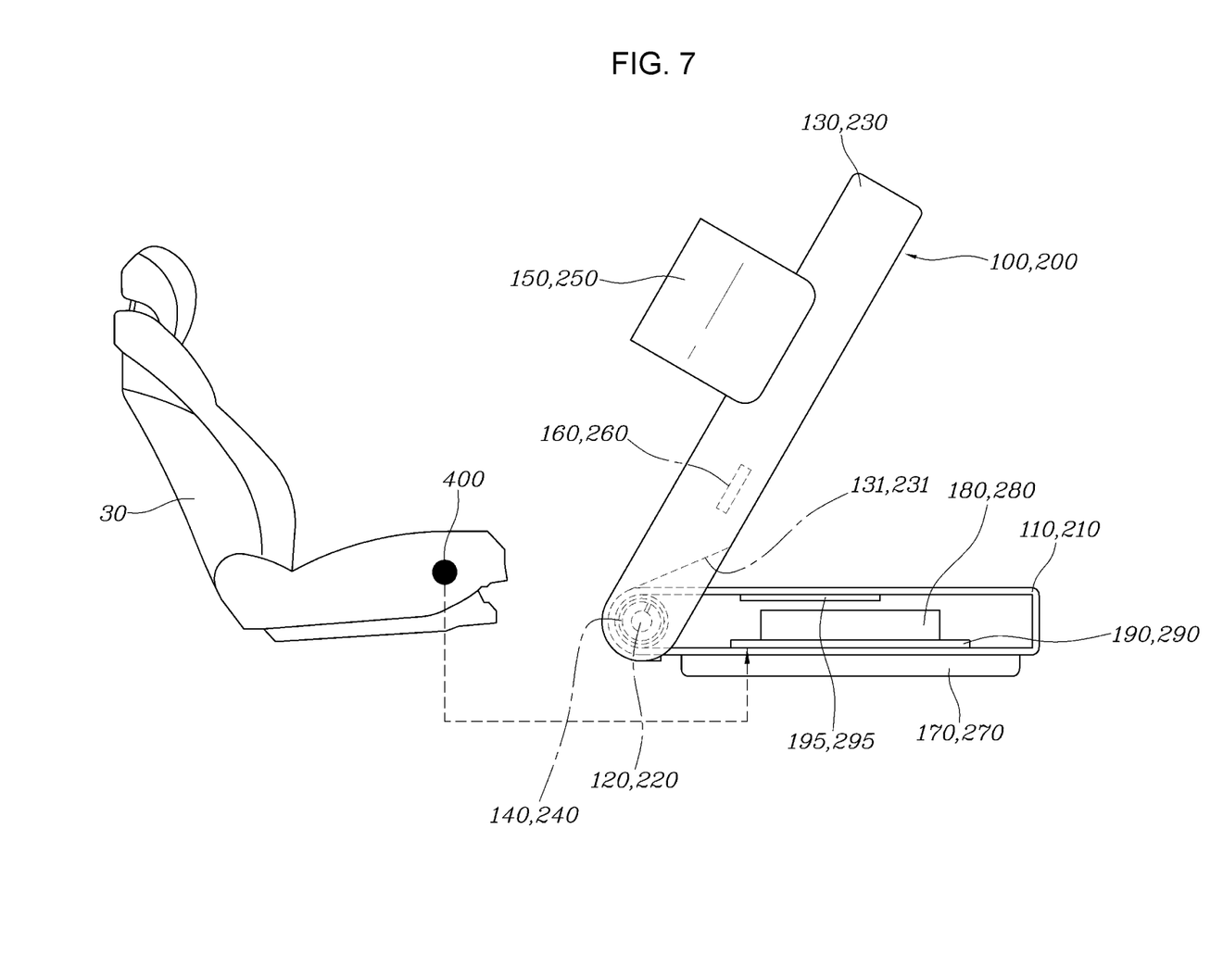
FIG. 7 is a view explaining the structure of an accelerator pedal assembly and a brake pedal assembly.
Figure 8:
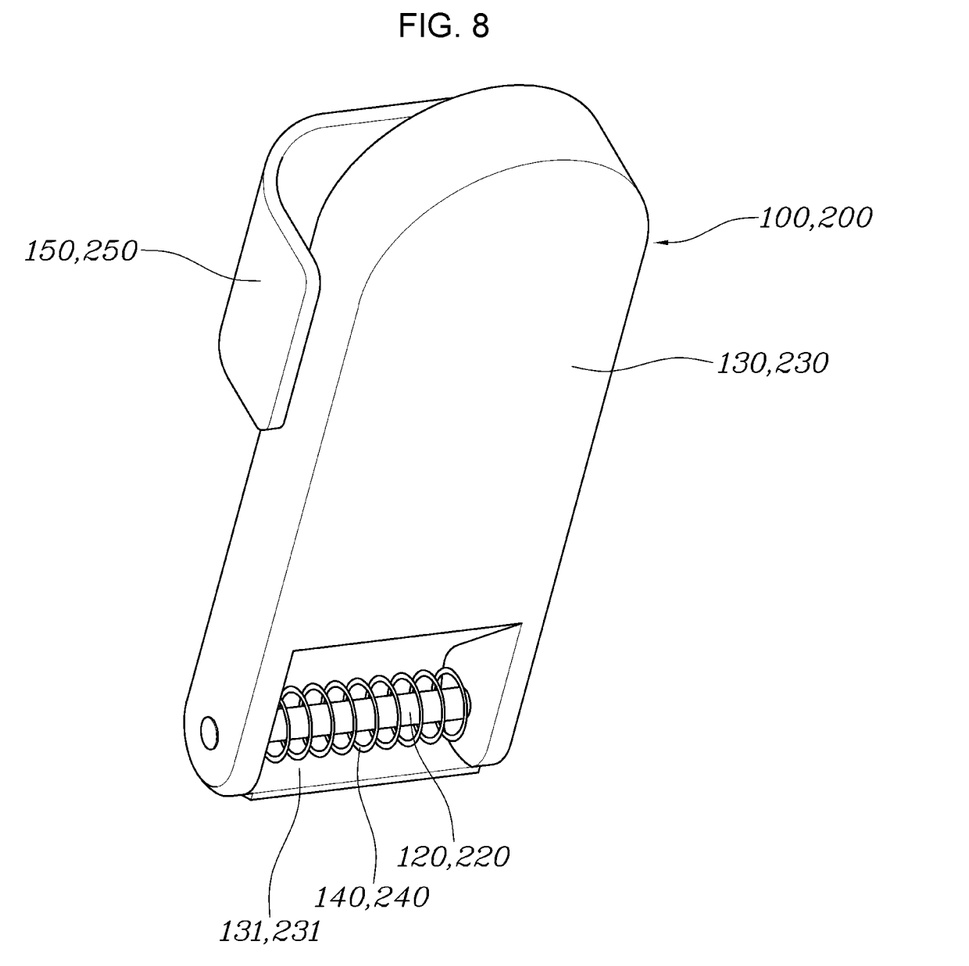
FIG. 8 is a view exemplarily illustrating a pad portion according to various exemplary embodiments of the present invention.

That is, in FIG. 4, a state of the pad portion 130 or 230 illustrated by a solid line is a state where the pad portion 130 or 230 returns to its initial position by a return force of the return spring 140 or 240, and a state of the pad portion 130 or 230 illustrated by a dotted line is a full stroke state in which the pad portion 130 or 230 is maximally rotated forward around the hinge pin 120 or 220 through the driver's operation.

If the pad portion 130 or 230 is maximally rotated forward around the hinge pin 120 or 220 through the driver's operation in a state where one end portion of the base portion 110 or 210 is inserted into the pad groove 131 or 231 formed at the bottom end portion of the pad portion 130 or 230, a top surface of the pad groove 131 or 231 comes in contact with a top surface of the base portion 110 or 210, and in the instant case, the pad portion 130 or 230 gets into the full stroke state where the pad portion is maximally rotated forward thereof.

If the driver releases the operation force in a state where the pad portion 130 or 230 is operated, the pad portion 130 or 230 is rotated backward around the hinge pin 120 or 220 by the return force of the return spring 140 or 240 and returns to its initial position, and in the instant case, a bottom surface of the pad groove 131 or 231 comes in contact with a bottom surface of the base portion 110 or 210, and through this, the pad portion 130 or 230 is rotated backward and returns to its initial position.

According to various exemplary embodiments of the present invention, a permanent magnet 160 or 260 is provided on the pad portion 130 or 230, and as the permanent magnet 160 or 260 is magnetically coupled to the front inclined surface 11 of the footrest panel 10, the pad portion 130 or 230 comes in contact with the front inclined surface 11 of the footrest panel 10 and the position of the pad portion is fixed, and through this, the accelerator pedal assembly 100 and the brake pedal assembly 200 maintain the hide state in the autonomous driving mode.

For magnetic combination with the permanent magnet 160 or 260, the front inclined surface 11 of the footrest panel 10 may be formed of steel.

Furthermore, the front inclined surface 11 of the footrest panel 10 may be formed of plastic, and in the instant case, a specific region of the front inclined surface 11 may be combined with a bracket 300 of a steel material for the magnetic combination with the permanent magnet 160 or 260.

Meanwhile, a guide hole 13, through which the base portion 110 or 210 penetratingly moves, is formed in the footrest panel 10 so that the pad portion 130 or 230 comes in contact with the front inclined surface 11 of the footrest panel 10.

The guide hole 13 is formed at a bottom end portion of the front inclined surface 11 of the footrest panel 10 to be connected to the bottom surface 12.

Furthermore, an electromagnet control printed circuit board (PCB) 190 or 290 controlling a power supply of the battery 180 or 280 to the electromagnet 170 or 270 is further provided on the base portion 110 or 210, and the electromagnet control PCB 190 or 290 performs a control operation through reception of a signal of an electromagnet button 400 provided on a driver's seat 30.

If the driver accommodated on the driver's seat 30 operates the electromagnet button 400, a signal of the electromagnet button 400 is transferred to the electromagnet control PCB 190 or 290 wirelessly or via wire, and the electromagnet control PCB 190 or 290 receives the transferred signal of the electromagnet button 400, and performs a control function to supply the power of the battery 180 or 280 to the electromagnet 170 or 270 or to block the power supply.

If the power of the battery 180 or 280 is supplied to the electromagnet 170 or 270, the electromagnet 170 or 270 becomes a magnet and is magnetically coupled to the bottom surface 12 of the footrest panel 10, and in the instant case, the accelerator pedal assembly 100 and the brake pedal assembly 200 get into the popup state as the positions of the accelerator pedal assembly 100 and the brake pedal assembly 200 are fixed to the bottom surface 12 in a state where the accelerator pedal assembly 100 and the brake pedal assembly 200 move to the position desired by the driver, and through this, implementation of the manual driving mode becomes possible.

According to various exemplary embodiments of the present invention, a signal recognition PCB 195 or 295 is provided on the base portion 110 or 210 to face the permanent magnet 160 or 260, and when the pad portion 130 or 230 is rotated, the signal recognition PCB 195 or 295 detects a rotation angle of the pad portion 130 or 230 through flux changes of the permanent magnet 160 or 260, and generates the acceleration-related signal or the brake-related signal.

When the pad portion 130 or 230 comes in contact with the front inclined surface 11 of the foot rest panel 10, the permanent magnet 160 or 260 provided on the pad portion 130 or 230 is magnetically coupled to the front inclined surface 11, and is configured to maintain the accelerator pedal assembly 100 and the brake pedal assembly 200 in the hide state.

Furthermore, when the driver operates the pad portion 130 or 230, and the pad portion 130 or 230 is rotated around the hinge pin 120 or 220, the position of the permanent magnet 160 or 260 provided on the pad portion 130 or 230 is changed, and in the instant case, the signal recognition PCB 195 or 295 detects the rotation angle of the pad portion 130 or 230 through flux changes of the permanent magnet 160 or 260 according to the rotation of the pad portion 130 or 230, and generates the acceleration-related signal or the brake-related signal.

That is, the permanent magnet 160 or 260 is configured to maintain the accelerator pedal assembly 100 and the brake pedal assembly 200 in the hide state through magnetic combination with the front inclined surface 11, and furthermore to this, the permanent magnet 160 or 260 is configured to generate acceleration-related signal or the brake-related signal together with the signal recognition PCB 195 or 295 when the pad portion 130 or 230 is rotated through the driver's operation.

According to various exemplary embodiments of the present invention, a PCB 500 for position detection is provided on the front inclined surface 11 of the footrest panel 10 to detect a situation in which the permanent magnet 160 or 260 of the pad portion 130 or 230 is magnetically coupled to the front inclined surface 11 of the footrest panel 10, and a PCB 600 for charging control, which generates a charging signal to the battery 180 or 280 through reception of a signal of the PCB 500 for position detection, is provided on a body panel 40 connected to the footrest panel 10.

When the permanent magnet 160 or 260 is magnetically coupled to the front inclined surface 11 of the footrest panel 10, and thus the accelerator pedal assembly 100 and the brake pedal assembly 200 get into the hide state, the PCB 500 for position detection transmits a signal to the PCB 600 for charging control, and when a charging signal is generated under the control of the PCB 600 for charging control, wireless or wired charging to the battery 180 or 280 starts.

FIG. 1 and FIG. 2 show the hide state in which the exposure of the accelerator pedal assembly 100 and the brake pedal assembly 200 toward the driver is blocked as the base portion 110 or 210 of the accelerator pedal assembly 100 and the brake pedal assembly 200 is provided to penetrate the guide hole 13 of the footrest panel 10, the pad portion 130 or 230 comes in contact with the front inclined surface 11 of the footrest panel 10, and the permanent magnet 160 or 260 is magnetically coupled to the front inclined surface 11.

If the accelerator pedal assembly 100 and the brake pedal assembly 200 get into the hide state, the charging to the battery 180 or 280 starts under the control of the PCB 500 for position detection and the PCB 600 for charging control.

As described above, if the accelerator pedal assembly 100 and the brake pedal assembly 200 get into the hide state, the lower space of the driver's seat becomes a wide space without any pedal interference, and thus the driver can get a comfortable rest in a relax mode, and safety improvement may be sought through blocking of the pedal misoperation in the autonomous driving mode.

FIG. 3 is a view exemplarily illustrating a popup state in which an accelerator pedal assembly 100 and a brake pedal assembly 200 move backward along a bottom surface 12 of a footrest panel 10 exposed toward a driver.

If the driver moves the accelerator pedal assembly 100 and the brake pedal assembly 200 by pulling them backward after inserting the driver's foot or shoe 20 into the band portion 150 or 250 in the above-described hide state, the base portion 110 or 210 gets out of the guide hole 13 of the footrest panel 10 as shown in FIG. 3, and from the present time, the accelerator pedal assembly 100 and the brake pedal assembly 200 are exposed toward the driver.

If the driver operates the electromagnet button 400 provided on the driver's seat 30 after moving the accelerator pedal assembly 100 and the brake pedal assembly 200 to a desired position on the bottom surface 12 of the footrest panel 10, the power of the battery 180 or 280 is supplied to the electromagnet 170 or 270 under the control of the electromagnet control PCB 190 or 290, and the electromagnet 170 or 270 becomes a magnet, and is magnetically coupled to the bottom surface 12 of the footrest panel 10.

Accordingly, the positions of the accelerator pedal assembly 100 and the brake pedal assembly 200 are fixed to the bottom surface 12 of the footrest panel 10 in a state where they move to the positions desired by the driver, and thus they get into the popup state, and from the present time, the accelerator pedal assembly 100 and the brake pedal assembly 200 get into the manual driving mode in which they may be operated by the driver.

Furthermore, if the driver operates the pad portion 130 or 230 and the pad portion 130 or 230 is rotated around the hinge pin 120 or 220 in a state where the accelerator pedal assembly 100 and the brake pedal assembly 200 are popped up as shown in FIG. 3, the position of the permanent magnet 160 or 260 provided on the pad portion 130 or 230 is changed, and at the instant time, the signal recognition PCB 195 or 295 detects the rotation angle of the pad portion 130 or 230 through the flux change of the permanent magnet 160 or 260 according to the rotation of the pad portion 130 or 230, and generates the acceleration-related signal or the brake-related signal.

Meanwhile, according to various exemplary embodiments of the present invention, if a manual driving mode signal is generated during the autonomous driving in the autonomous vehicle disposed with the foldable pedal apparatus, the safety condition, on which whether the switchover to the manual driving mode is possible, is first checked, and the switchover to the manual driving mode becomes possible only in a state where all the safety conditions are satisfied.

Figure 9:
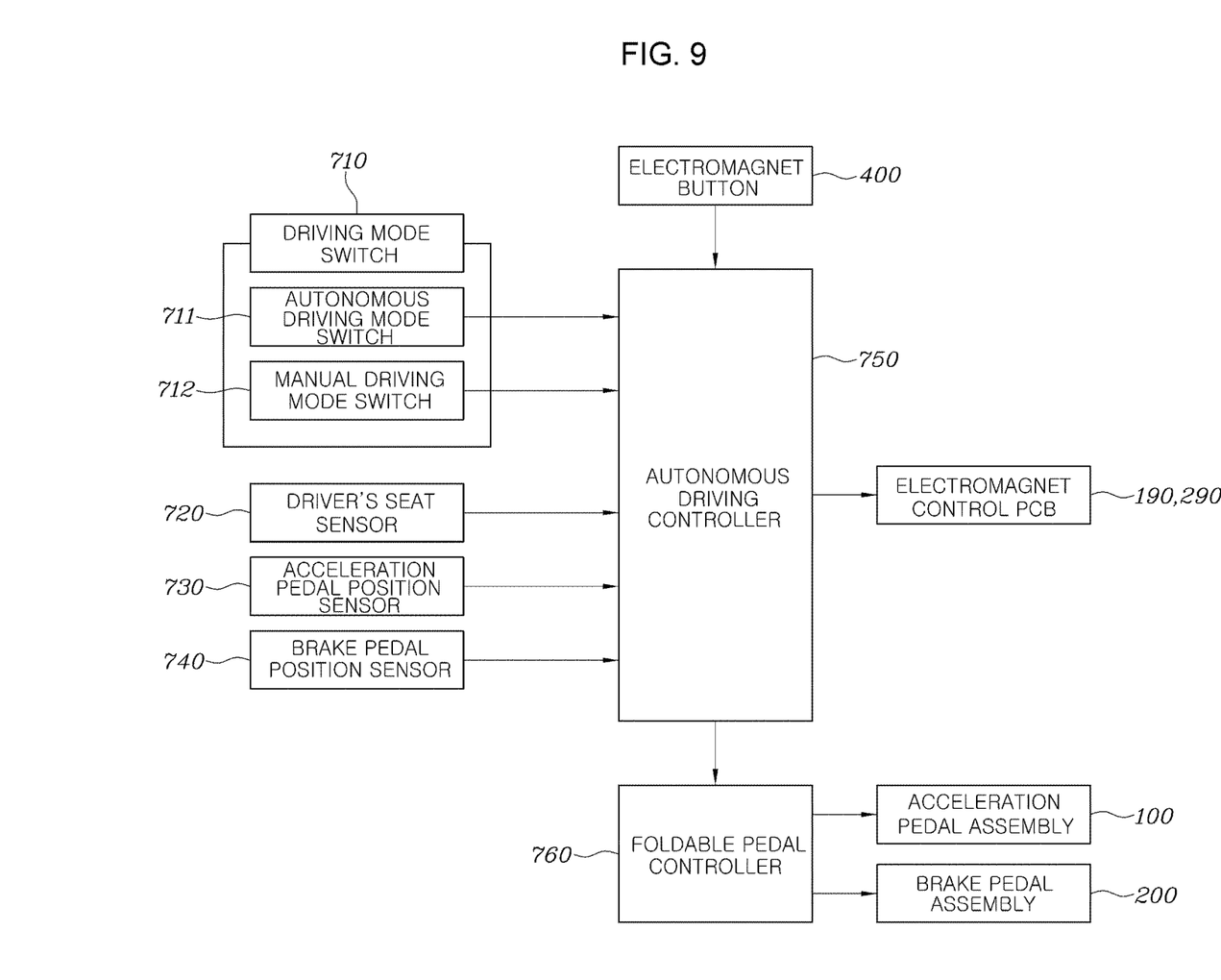
FIG. 9 and FIG. 10 are a block diagram and a flowchart explaining a method for controlling an operation of a foldable pedal apparatus of an autonomous vehicle according to various exemplary embodiments of the present invention.
Figure 10:
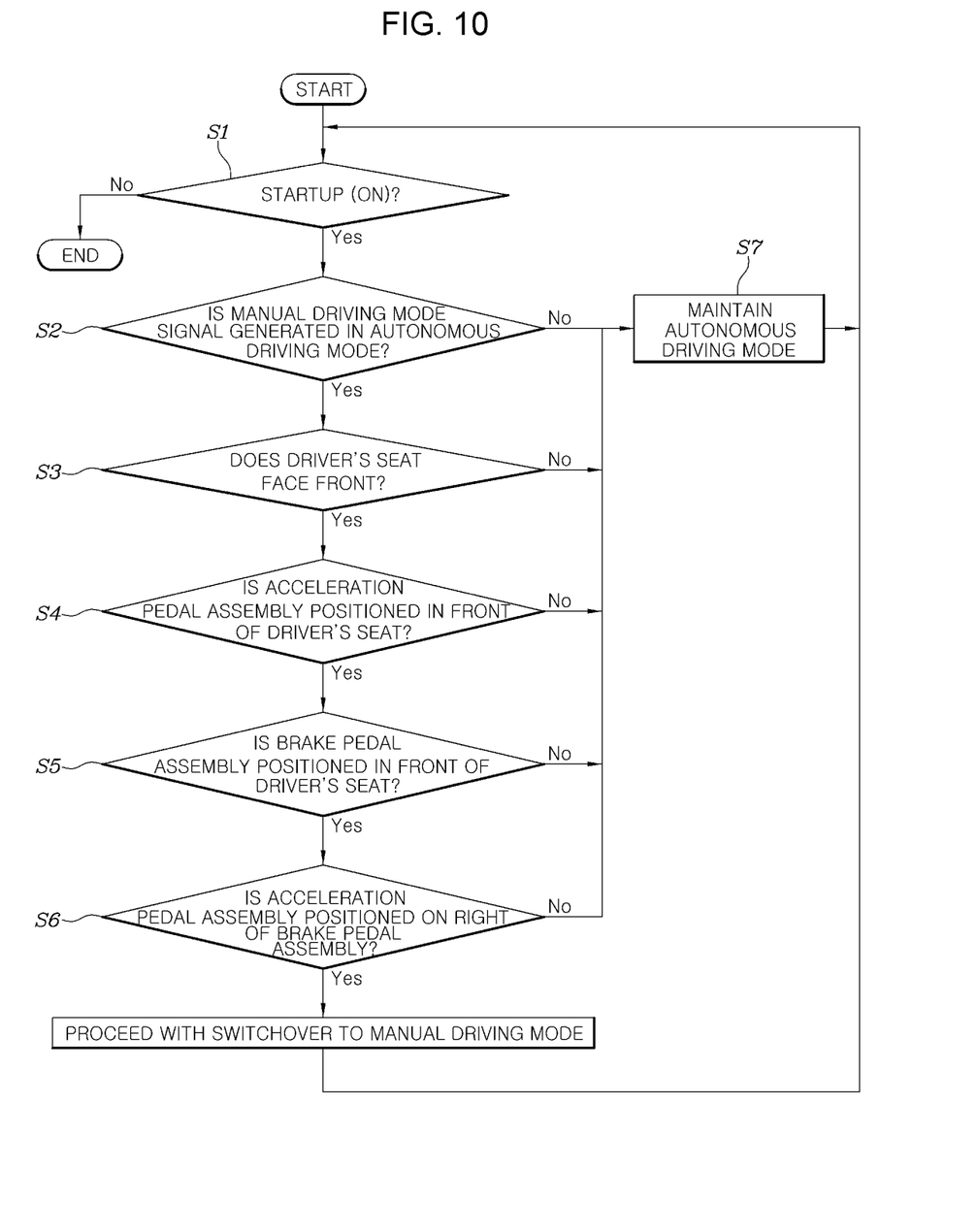

As illustrated in FIG. 9 and FIG. 10, a method for controlling an operation of a foldable pedal apparatus according to various exemplary embodiments of the present invention includes: detecting directivity of a driver's seat 30, a position of an accelerator pedal assembly 100, and a position of a brake pedal assembly 200 using signals of a driver's seat sensor 720, an accelerator pedal position sensor 730, and a brake pedal position sensor 740 when a manual driving mode signal is generated by operating a driving mode switch 710 in an autonomous driving mode after a vehicle startup; and supplying a power to an electromagnet 190 or 290 when an electromagnet button 400 provided on the driver's seat 30 is operated while switching the accelerator pedal assembly 100 and the brake pedal assembly 200 to a manual driving mode under the control of an autonomous driving controller 750 only in case of determining that all of the directivity of the driver's seat 30, the position of the accelerator pedal assembly 100, and the position of the brake pedal assembly 200 satisfy safety conditions.

The driver's seat sensor 720 may be provided on the driver's seat 30, the accelerator pedal position sensor 730 may be provided on the accelerator pedal assembly 100 or a body panel 40, and the brake pedal position sensor 740 may be provided on the brake pedal assembly 200 or the body panel 40.

The position of the accelerator pedal assembly 100 and the position of the brake pedal assembly 200 may be detected through the accelerator pedal position sensor 730 and the brake pedal position sensor 740 by making strengths of the electromagnets 170 and 270, strengths of the permanent magnets 160 and 260, and signals of the signal recognition PCBs 195 and 295 different from each other.

The safety conditions include a first condition on which the driver's seat 30 surfaces a vehicle front when the manual driving mode signal is generated in the autonomous driving mode, a second condition on which the accelerator pedal assembly 100 is positioned in front of the driver's seat 30, and a third condition on which the brake pedal assembly 200 is positioned in front of the driver's seat 30, wherein the accelerator pedal assembly 100 and the brake pedal assembly 200 are switched to the manual driving mode only in case that all of the first, second and third conditions are satisfied, and if any one of the first to third conditions is not satisfied, warning is issued, and the switchover to the manual driving mode is not performed.

Furthermore, the safety conditions according to various exemplary embodiments of the present invention further include a fourth condition on which the accelerator pedal assembly 100 is positioned on the right of the brake pedal assembly 200, wherein the accelerator pedal assembly 100 and the brake pedal assembly 200 are switched to the manual driving mode only in case that all of the first, second, third and fourth conditions are satisfied, and if any one of the first to fourth conditions is not satisfied, warning is issued, and the switchover to the manual driving mode is not performed.

On the fourth condition, control logic may be tuned so that the switchover to the manual driving mode becomes possible even if the condition is not necessarily satisfied according to driver's tendency.

If the vehicle starts up (S1), and if it is determined that a manual driving mode signal is generated through operation of a driving mode switch 710 in an autonomous driving mode (S2), an autonomous driving controller 750 determines whether the driver's seat faces the vehicle front (S3), whether all of the accelerator pedal assembly 100 and the brake pedal assembly 200 are positioned in front of the driver's seat 30 (S4 and S5), and whether the accelerator pedal assembly 100 is positioned on the right of the brake pedal assembly 200 (S6).

Furthermore, if the conditions of all the steps are satisfied in a process of sequentially performing the above steps s3, s4, s5, and s6, the control logic according to various exemplary embodiments of the present invention proceeds with the switchover to the manual driving mode.

Meanwhile, if it is determined that the manual driving mode signal is not generated at step s2, the current autonomous driving mode is continuously maintained (S7).

Furthermore, if the driver's seat does not surface the vehicle front, if the accelerator pedal assembly 100 is positioned in the rear of the driver's seat, if the brake pedal assembly 200 is positioned in the rear of the driver's seat 30, or if the accelerator pedal assembly 100 is positioned on the left of the brake pedal assembly 200 in a process of sequentially performing the steps S3, S4, S5, and S6, the control logic according to various exemplary embodiments of the present invention does not proceed with the switchover to the manual driving mode, but issues warning, and is fed back to the step S7 in which the autonomous driving mode is continuously maintained.

In the foldable pedal apparatus according to various exemplary embodiments of the present invention as described above, in the autonomous driving mode, the accelerator pedal assembly 100 and the brake pedal assembly 200 move forward and are fixed to the position (hide state) as they are combined with the front inclined surface 11 of the footrest panel 10, and in the manual driving mode, they move and are fixed to the position where the driver can comfortably operate them (popup state), so that in case of the switchover from the autonomous driving mode to the manual driving mode, the fixed position of the pedal apparatus may be differently set for each driver, and thus driver's convenience may be improved in operating the pedal apparatus.

Furthermore, according to the exemplary embodiment of the present invention, in case of the switchover from the autonomous driving mode to the manual driving mode, the switchover to the manual driving mode becomes possible only in the state where all the safety conditions for directivity of the driver's seat and the positions of the accelerator pedal assembly 100 and the brake pedal assembly 200 are satisfied, and through this, risks of the driver's misoperation and accident occurrence may be greatly reduced.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable pedal apparatus for a vehicle, the foldable pedal apparatus comprising:
    an accelerator pedal assembly generating an acceleration-related signal and a brake pedal assembly generating a brake-related signal in response to operation of the accelerator pedal assembly and the brake pedal assembly,
    wherein in an autonomous driving mode of the vehicle, the accelerator pedal assembly and the brake pedal assembly get into a hide state as the accelerator pedal assembly and the brake pedal assembly come in contact with a front inclined surface of a footrest panel and positions thereof are fixed, and
    wherein in a manual driving mode of the vehicle, the accelerator pedal assembly and the brake pedal assembly get into a popup state as positions of the accelerator pedal assembly and the brake pedal assembly are fixed to a bottom surface of the footrest panel in a state where the accelerator pedal assembly and the brake pedal assembly move to positions desired by a driver on the bottom surface.

2. The foldable pedal apparatus of claim 1, wherein each of the accelerator pedal assembly and the brake pedal assembly includes:
    a base portion coming in contact with the bottom surface of the footrest panel;
    a pad portion hingedly connected to the base portion and rotatably operating in response to a movement of a driver's foot or shoe coming in contact thereto; and
    a return spring engaged to the pad portion and providing a return force to the pad portion when the pad portion is rotated.

3. The foldable pedal apparatus of claim 2, wherein each of the accelerator pedal assembly and the brake pedal assembly further includes a band portion provided on the pad portion so as to surround and fasten a foot or a shoe of a driver coming in contact with the pad portion, to the pad portion.

4. The foldable pedal apparatus of claim 2, wherein a bottom end portion of the pad portion is hingedly connected to one end portion of the base portion and a top end portion of the pad portion is pivotable around a hinge pin of the bottom end portion.

5. The foldable pedal apparatus of claim 2, wherein a pad groove, into which one end portion of the base portion is inserted, is formed at a bottom end portion of the pad portion.

6. The foldable pedal apparatus of claim 5, wherein when the pad portion is rotated against the base portion around a hinge pin, the pad groove comes in contact with the base portion and regulates a full stroke position and an initial position of the pad portion.

7. The foldable pedal apparatus of claim 2, wherein a permanent magnet is provided on the pad portion, and
- as the permanent magnet is magnetically coupled to the front inclined surface of the footrest panel, the pad portion comes in contact with the front inclined surface of the footrest panel and a position of the pad portion is fixed, so that the accelerator pedal assembly and the brake pedal assembly maintain the hide state in the autonomous driving mode.

8. The foldable pedal apparatus of claim 7, wherein an electromagnet is provided on the base portion, and
- as the electromagnet is magnetized and is magnetically coupled to the bottom surface of the footrest panel, a position of the base portion is fixed to the bottom surface of the footrest panel in a state where the base portion moves to the positions desired by the driver on the bottom surface, and the accelerator pedal assembly and the brake pedal assembly maintain the popup state in the manual driving mode.

9. The foldable pedal apparatus of claim 8, wherein a battery supplying a power to the electromagnet is provided on the base portion.

10. The foldable pedal apparatus of claim 9, wherein when the accelerator pedal assembly and the brake pedal assembly get into the hide state, the battery starts to be charged.

11. The foldable pedal apparatus of claim 8,
- wherein an electromagnet control printed circuit board (PCB) configured for controlling a power supply of a battery to the electromagnet is further provided on the base portion, and
- wherein the electromagnet control PCB is configured to perform a control operation through reception of a signal of an electromagnet button provided on a driver's seat.

12. The foldable pedal apparatus of claim 8,
- wherein a signal recognition PCB is provided on the base portion to face the permanent magnet, and
- wherein when the pad portion is rotated, the signal recognition PCB is configured to detect a rotation angle of the pad portion through flux changes of the permanent magnet, and to generate the acceleration-related signal or the brake-related signal.

13. The foldable pedal apparatus of claim 8,
- wherein a PCB for position detection is provided on the front inclined surface of the footrest panel to detect a situation in which the permanent magnet of the pad portion is magnetically coupled to the front inclined surface of the footrest panel, and
- wherein a PCB for charging control, which generates a charging signal to a battery through reception of a signal of the PCB for position detection, is provided on a body panel connected to the footrest panel.

14. The foldable pedal apparatus of claim 2, wherein a guide hole, through which the base portion penetratingly moves, is formed in the footrest panel so that the pad portion comes in contact with the front inclined surface of the footrest panel when the base portion penetratingly moves through the guide hole.

15. A method for controlling an operation of the foldable pedal apparatus of claim 1, the method including:
- detecting directivity of a driver's seat, a position of the accelerator pedal assembly, and a position of the brake pedal assembly using signals of a driver's seat sensor, an accelerator pedal position sensor, and a brake pedal position sensor, respectively when a manual driving mode signal is generated in response to operation of a driving mode switch in the autonomous driving mode after a vehicle startup; and
- supplying a power to an electromagnet provided on a base portion of each of the accelerator pedal assembly and the brake pedal assembly when an electromagnet button provided on the driver's seat is operated while switching the accelerator pedal assembly and the brake pedal assembly to the manual driving mode under control of an autonomous driving controller only in case of determining that all of the directivity of the driver's seat, the position of the accelerator pedal assembly, and the position of the brake pedal assembly satisfy safety conditions.

16. The method of claim 15, wherein the safety conditions include:
- a first condition on which the driver's seat faces a vehicle front when the manual driving mode signal is generated in the autonomous driving mode;
- a second condition on which the accelerator pedal assembly is positioned in front of the driver's seat; and
- a third condition on which the brake pedal assembly is positioned in front of the driver's seat,
- wherein the accelerator pedal assembly and the brake pedal assembly are switched to the manual driving mode only in case that all of the first, second and third conditions are satisfied.

17. The method of claim 16, wherein the safety conditions further include a fourth condition on which the accelerator pedal assembly is positioned on right of the brake pedal assembly,
- wherein the accelerator pedal assembly and the brake pedal assembly are switched to the manual driving mode only in case that all of the first, second, third and fourth conditions are satisfied.

* * * * *